US010287950B2

(12) United States Patent
Patel et al.

(10) Patent No.: US 10,287,950 B2
(45) Date of Patent: May 14, 2019

(54) HOUSING MEMBER FOR ENCLOSING AFTERTREATMENT MODULE OF ENGINE

(71) Applicant: Progress Rail Locomotive Inc., LaGrange, IL (US)

(72) Inventors: Ajay Patel, Joliet, IL (US); Richard C Kulaga, Naperville, IL (US); Haridasa Raghavendra Tantry, Bangalore (IN)

(73) Assignee: Progress Rail Locomotive Inc., LaGrange, IL (US)

( * ) Notice: Subject to any disclaimer, the term of this patent is extended or adjusted under 35 U.S.C. 154(b) by 392 days.

(21) Appl. No.: 14/931,084

(22) Filed: Nov. 3, 2015

(65) Prior Publication Data

US 2017/0122174 A1 May 4, 2017

(51) Int. Cl.
| F01N 1/00 | (2006.01) |
| F01N 3/24 | (2006.01) |
| F01N 3/021 | (2006.01) |
| F01N 3/20 | (2006.01) |
| F01N 3/10 | (2006.01) |

(Continued)

(52) U.S. Cl.
CPC ............ *F01N 3/24* (2013.01); *F01N 3/021* (2013.01); *F01N 3/103* (2013.01); *F01N 3/2066* (2013.01); *F01N 13/009* (2014.06); *F01N 13/08* (2013.01); *F01N 2340/00* (2013.01); *F01N 2340/02* (2013.01); *F01N 2340/06* (2013.01); *F01N 2450/22* (2013.01); *F01N 2450/24* (2013.01); *F01N 2570/14* (2013.01); *F01N 2590/02* (2013.01); *F01N 2590/08* (2013.01); *F01N 2610/02* (2013.01); *Y02T 10/24* (2013.01)

(58) Field of Classification Search
CPC .......... F01N 3/021; F01N 13/009; F01N 3/24; F01N 3/103

USPC ........................................................ 60/324
See application file for complete search history.

(56) References Cited

U.S. PATENT DOCUMENTS

| 6,910,550 B2 | 6/2005 | Schlossarczyk et al. |
| 7,878,300 B2 | 2/2011 | Sammut et al. |

(Continued)

FOREIGN PATENT DOCUMENTS

| DE | 10123359 | 11/2002 |
| EP | 2687700 | 1/2014 |
| WO | 2014056877 | 4/2014 |

OTHER PUBLICATIONS

English translation of EP 2687700 A2 (Jun. 2013).*

*Primary Examiner* — Jason D Shanske
(74) *Attorney, Agent, or Firm* — Miller, Matthias & Hull

(57) ABSTRACT

A housing member for enclosing an aftertreatment module of an engine is provided. The housing member includes a base member, a plurality of side members extending from the base member, and a top member coupled to the plurality of side members. The base member, the plurality of side members and the top member are together configured to define an inlet chamber and an outlet chamber. The housing member includes an inlet port defined on at least one of the plurality of side members and configured to communicate with the inlet chamber. The inlet port is coupled to an exhaust conduit of the engine to receive exhaust gas. The housing member includes a plurality of outlet ports defined on the top member and at least one of the plurality of side members. The plurality of outlet ports communicates with the outlet chamber to discharge the exhaust gas from the aftertreatment module.

17 Claims, 5 Drawing Sheets

(51) Int. Cl.
*F01N 13/00* (2010.01)
*F01N 13/08* (2010.01)

(56) References Cited

U.S. PATENT DOCUMENTS

| | | |
|---|---|---|
| 8,596,049 B2 | 12/2013 | Isada et al. |
| 8,683,788 B2 * | 4/2014 | Mitsuda ................ F01N 3/0211 60/311 |
| 8,747,788 B1 | 6/2014 | Baig et al. |
| 2006/0153748 A1 * | 7/2006 | Huthwohl ........... B01F 3/04049 422/172 |
| 2009/0293467 A1 * | 12/2009 | Boeckenhoff ........... F01N 3/021 60/324 |

* cited by examiner

HOUSING MEMBER FOR ENCLOSING AFTERTREATMENT MODULE OF ENGINE

TECHNICAL FIELD

The present disclosure relates, in general, to an engine and, in particular, to a housing member for enclosing an aftertreatment module of the engine.

BACKGROUND

Marine vessels, such as boats and ships include an engine for propelling the marine vessel over a water body, such as a canal, a river, a sea and the like. The engine may be disposed in an engine room of the marine vessels. The engine includes an aftertreatment module in communication with an exhaust gas of the engine for controlling emission of the exhaust gas discharged to atmosphere. The aftertreatment module may be connected to various noise attenuation devices, such as a muffler. The aftertreatment module and the various noise attenuation devices are disposed in an engine room adjacent to the engine. Further, location of the aftertreatment module relative to the engine is typically fixed in various applications. Since a space surrounding the engine is confined within the engine room due to the large size of the aftertreatment module, it is difficult to couple an exhaust pipe with an outlet port of the aftertreatment module within the engine room to discharge the exhaust gas to atmosphere. Furthermore, application of the aftertreatment module along with the medium speed engine used in the marine vessel is limited due to such specific outlet port location and lack of flexibility in arranging the exhaust pipe within the engine room.

European Patent Number 2,687,700 discloses an exhaust gas charge and an exhaust gas treatment module for an internal combustion engine. The exhaust treatment module has terminals that are used for supplying and outputting exhaust gas in the exhaust gas charge and the exhaust gas treatment module, respectively. The terminals are used for supplying air in the exhaust gas charge and the exhaust gas treatment module, respectively. The exhaust gas treatment module also includes multiple turbines, multiple superchargers, and multiple compressors. The turbines are provided with the superchargers and are connected with a selective catalytic reduction (SCR) catalytic converter. The compressors are also provided with the superchargers.

SUMMARY OF THE DISCLOSURE

In one aspect of the present disclosure, a housing member for enclosing an aftertreatment module of an engine is provided. The housing member includes a base member. The housing member also includes a plurality of side members extending from the base member. The housing member includes a top member coupled to the plurality of side members. The base member, the plurality of side members and the top member are together configured to define an inlet chamber and an outlet chamber. The housing member also includes an inlet port defined on at least one of the plurality of side members and configured to communicate with the inlet chamber. The inlet port is coupled to an exhaust conduit of the engine to receive exhaust gas therethrough. The housing member further includes a plurality of outlet ports defined on the top member and at least one of the plurality of side members. The plurality of outlet ports communicates with the outlet chamber to discharge the exhaust gas from the aftertreatment module.

In another aspect of the present disclosure, an engine for a marine vessel is provided. The engine includes an exhaust conduit. The engine includes a housing member coupled to the exhaust conduit and enclosing an aftertreatment module of the engine. The housing member includes a base member. The housing member also includes a plurality of side members extending from the base member. The housing member includes a top member coupled to the plurality of side members. The base member, the plurality of side members and the top member are together configured to define an inlet chamber and an outlet chamber. The housing member also includes an inlet port defined on at least one of the plurality of side members and configured to communicate with the inlet chamber. The inlet port is coupled to the exhaust conduit of the engine to receive exhaust gas therethrough. The housing member further includes a plurality of outlet ports defined on the top member and at least one of the plurality of side members. The plurality of outlet ports communicates with the outlet chamber to discharge the exhaust gas from the aftertreatment module.

In yet another aspect of the present disclosure, a housing member for enclosing an aftertreatment module of an engine is provided. The housing member includes a base member. The housing member includes a plurality of side members extending from the base member. The plurality of side members includes a first side member. The plurality of side members includes a second side member spaced apart from the first side member. The plurality of side members includes a front side member extending between the first side member and the second side member at a front end of the base member. The plurality of side members further includes a rear side member extending between the first side member and the second side member at a rear end of the base member. Further, the housing member includes a top member coupled to the plurality of side members. The base member, the plurality of side members and the top member are together configured to define an inlet chamber and an outlet chamber. The plurality of side members includes an inlet port defined on at least one of the plurality of side members and configured to communicate with the inlet chamber. The inlet port is coupled to an exhaust conduit of the engine to receive exhaust gas therethrough. The housing member further includes a plurality of outlet ports defined on the top member and at least one of the plurality of side members. The plurality of outlet ports communicates with the outlet chamber to discharge the exhaust gas from the aftertreatment module. The plurality of outlet ports includes a first front outlet port and a first rear outlet port defined on the front side member and the rear side member, respectively, along a first longitudinal axis. The plurality of outlet ports also includes a second front outlet port and a second rear outlet port defined on the front side member and the rear side member, respectively, along a second longitudinal axis. The first longitudinal axis and the second longitudinal axis are spaced apart from each other. The plurality of outlet ports also includes a top outlet port defined on the top member.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
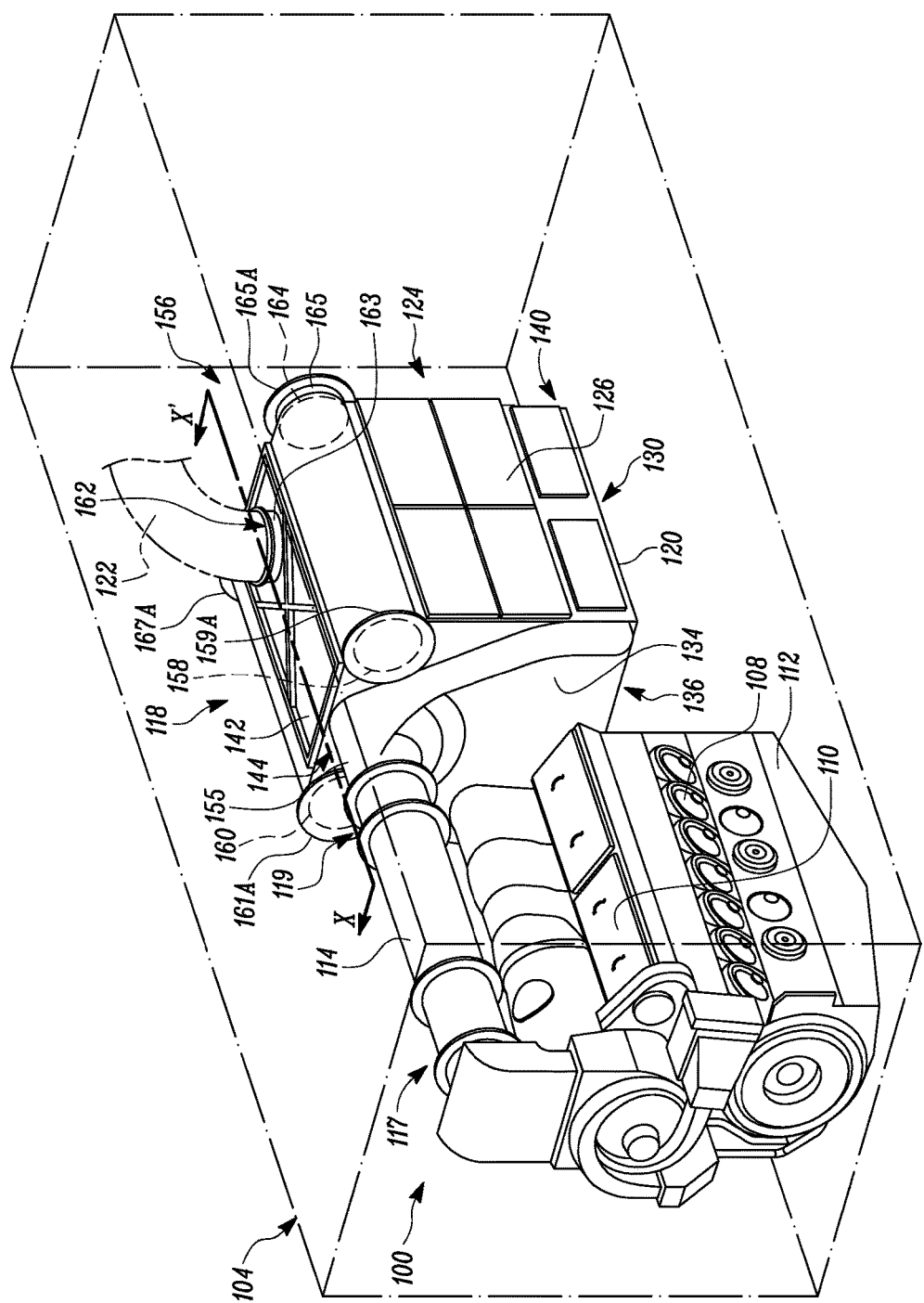
FIG. 1 is a perspective view of an engine having a housing member, according to an embodiment of the present disclosure.

FIG. 1 illustrates a perspective view of an engine 100 disposed within a marine vessel (not shown), according to an embodiment of the present disclosure. The marine vessel, for example, a ship or a boat may be configured to be operated in a water body, such as a sea, a lake, a canal, and the like. In the illustrated embodiment, the engine 100 is disposed in an engine room 104 of the marine vessel. In an embodiment, the engine room 104 may correspond to a hull portion disposed below a deck portion (not shown) of the marine vessel. However, in other embodiments, the engine room 104 may be disposed adjacent to a stern portion (not shown) of the marine vessel. The engine 100 may be configured to provide a rotary power to a propeller (not shown) disposed below the hull portion to propel the marine vessel over the water body.

The engine 100 may be an internal combustion engine run by fuels, such as diesel, gasoline, a gaseous fuel, or a combination thereof. The engine 100 may further include multiple cylinders defined in various configurations, such as 'V' type configuration, in-line configuration, radial configuration or rotary configuration. In various embodiments, the engine 100 may be used to power any machine, such as an on-highway vehicle, an off-highway machine, an earth moving equipment, and a generator. Further, the engine 100 may be used in any engine powered applications, such as a locomotive, a generator, and the like.

The engine 100 includes a cylinder block 108 for defining the cylinders (not shown) therein. The engine 100 further includes a cylinder head 110 mounted on the cylinder block 108. The cylinder head 110 may define one or more intake ports for receiving ambient air and one or more exhaust ports for discharging exhaust gas from the cylinders. An intake manifold (not shown) may be coupled to the one or more intake ports for receiving the ambient air therethrough, and an exhaust manifold (not shown) may be coupled to the one or more exhaust ports for discharging the exhaust gas therethrough. The engine 100 further includes an oil pan 112 for containing lubrication oil within the engine 100. The engine 100 may also include various accessory systems, such as a fuel supply system, an air intake system, a cooling system, and a turbocharger disposed in association with the engine 100.

Referring to FIG. 1, an exhaust conduit 114 is disposed in communication with the exhaust manifold. The exhaust conduit 114 is configured to receive the exhaust gas exiting the exhaust manifold of the engine 100. In the illustrated embodiment, the exhaust conduit 114 is disposed between the cylinder head 110 and the deck portion of the marine vessel. In various embodiments, the exhaust conduit 114 may be disposed at any location in the engine room 104 below the deck portion. The exhaust conduit 114 further includes a first end 117 disposed proximal to the exhaust manifold of the engine 100, and a second end 119 disposed distal to the exhaust manifold of the engine 100. The first end 117 is configured to be coupled to the exhaust manifold of the engine 100 for transfer of exhaust gas therethrough. Exhaust gas contains emission compounds that may include oxides of Nitrogen (NOx), unburned hydrocarbons, particulate matter, and/or other combustion products known in the art.

The engine 100 and the accessory systems may be disposed within a space available in the engine room 104 below the deck portion. The engine 100 further includes an aftertreatment module 116 (shown in FIG. 2). The aftertreatment module 116 is configured to control emission of the exhaust gas produced by the engine 100. More specifically, the aftertreatment module 116 is configured to trap oxides of Nitrogen (NOx), unburned hydrocarbons, particulate matter, and/or other combustion products known in the art. In an example, the aftertreatment module 116 may include a Diesel Particulate Filter (DPF) system and a Selective Catalytic Reduction (SCR) system. The DPF system may include a Diesel Oxidation Catalyst (DOC) and a DPF. The DOC may be used to reduce hydrocarbons and carbon monoxide in the exhaust gas. As the exhaust gas passes through the DPF, particulate matter contained in the exhaust gas may be trapped in the DPF and prevented from releasing to the atmosphere. The SCR system may include Diesel Exhaust Fluid (DEF) and a SCR catalyst. The DEF may be sprayed in the exhaust gas to react with the SCR catalyst and to convert the Nitrogen Oxide into Nitrogen and water vapor. Referring to FIG. 1, a housing member 118 is configured to be in communication with the exhaust conduit 114 for enclosing the aftertreatment module 116. The housing member 118 is coupled to the exhaust conduit 114 of the engine 100. The DPF system and the SCR system may be disposed within the housing member 118.

Figure 2:
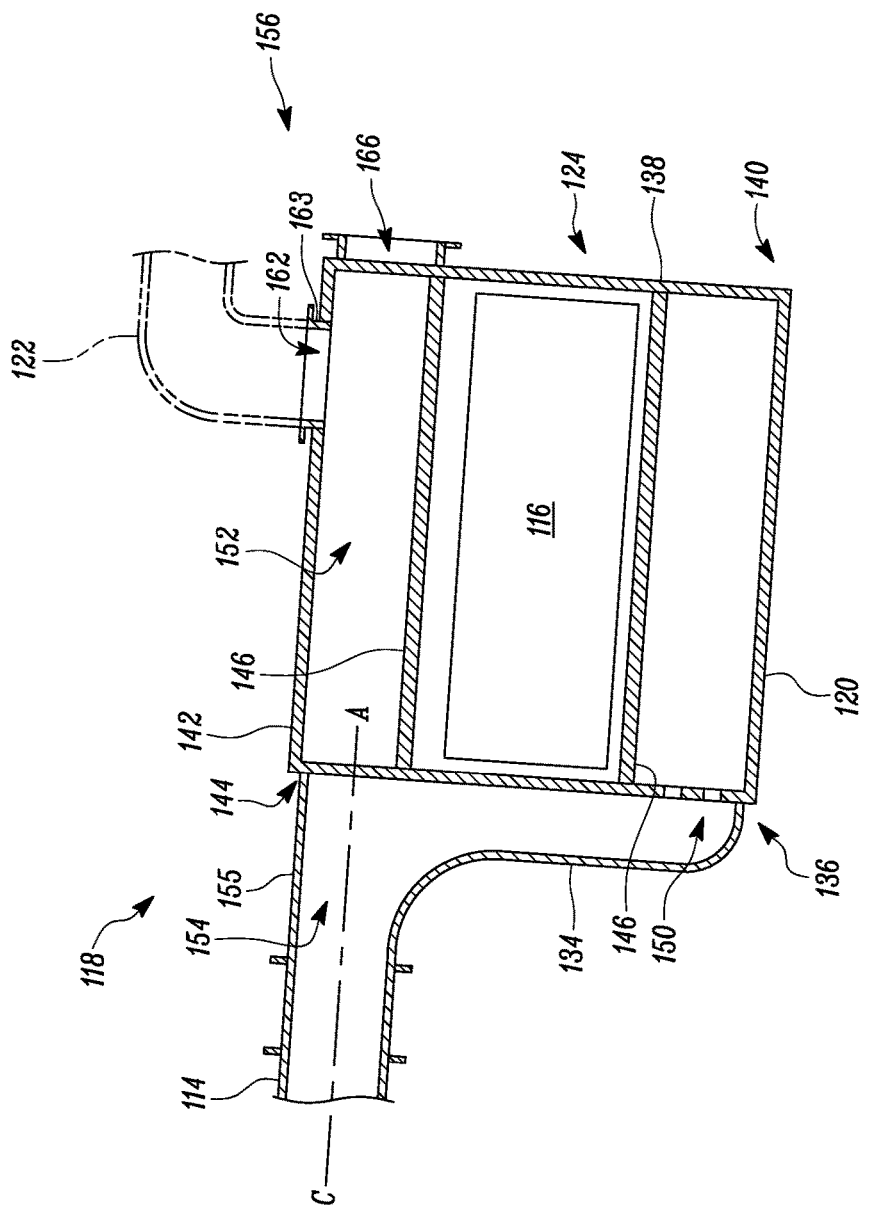
FIG. 2 is a sectional view of the housing member taken along a section line X-X' in FIG. 1, according to an embodiment of the present disclosure.

FIG. 2 illustrates a sectional view of the housing member 118 taken along a section line X-X' in FIG. 1. Referring to FIG. 1 and FIG. 2, the housing member 116 is adapted to be disposed beside the engine 100 to optimally utilize the space available in the engine room 104 below the deck portion. In an embodiment, the housing member 118 may be supported on a supporting member (not shown). Various accessory equipment of the engine 100, such as a water pump and components associated with the cooling system may be disposed below the housing member 116.

The housing member 118 includes a base member 120 and a plurality of side members 124 extending from the base member 120. In an embodiment, the side members 124 may be integrally formed with the base member 120. In another embodiment, the side members 124 may be separately coupled to the base member 120. The side members 124 includes a first side member 126 and a second side member 128 (shown in FIG. 4) spaced apart from the first side member 126. The first side member 126 extends from a first end 130 of the base member 120 and the second side member 128 extends from a second end 132 (shown in FIG. 4) of the base member 120. The side members 124 also include a front side member 134 extending between the first side member 126 and the second side member 128. The front side member 134 is disposed at a front end 136 of the base member 120. The side members 124 further include a rear side member 138 (shown in FIG. 2) extending between the first side member 126 and the second side member 128 from a rear end 140 of the base member 120.

The housing member 118 further includes a top member 142 coupled to the side members 124 at a top end 144 of the side members 124. In an embodiment, the top member 142 may be integrally formed with the side members 124. In another embodiment, the top member 142 may be separately coupled to the side members 124.

As shown in FIG. 2, the housing member 118 includes multiple connecting walls 146 extending between the side members 124. The top member 142, the base member 120 and the side members 124 are together configured to define an inlet chamber 150 and an outlet chamber 152. The aftertreatment module 116 is disposed between the inlet chamber 150 and the outlet chamber 152. In the illustrated embodiment, the inlet chamber 150 is defined adjacent to the base member 120, and the outlet chamber 152 is defined adjacent to the top member 142. The outlet chamber 152 is configured to be in fluid communication with the inlet chamber 150 to receive the exhaust gas from the inlet chamber 150 through the aftertreatment module 116.

The housing member 118 further includes an inlet port 154 defined on the front side member 134, adjacent to the top member 142, along a central axis 'CA' of the housing member 118. However, in various embodiments, the inlet port 154 may be defined on one of the second side member 128, the rear side member 138, and the first side member 126. The inlet port 154 may be defined by an inlet duct 155 extending from the front side member 134. The inlet duct 155 is defined adjacent to the top member 142 and coupled to the second end 119 of the exhaust conduit 114. The inlet port 154 is configured to receive the exhaust gas from the exhaust conduit 114 therethrough. The inlet port 154 is further communicated with the inlet chamber 150. Thus, exhaust gas produced by the engine 100 passes through the exhaust conduit 114 to communicate with the aftertreatment module 116 disposed between the inlet chamber 150 and the outlet chamber 152.

Figure 3:
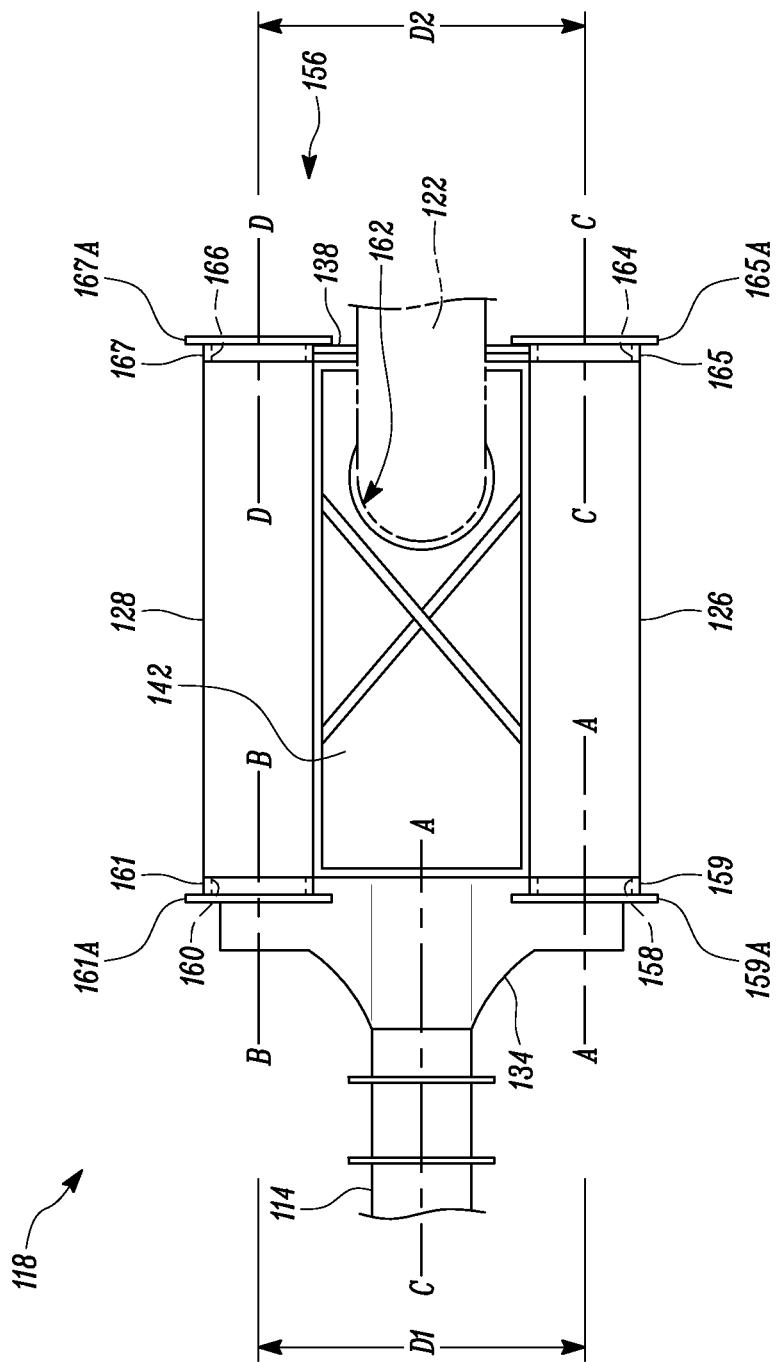
FIG. 3 is a top view of the housing member, according to an embodiment of the present disclosure.

FIG. 3 illustrates a top view of the engine 100, according to an embodiment of the present disclosure. The housing member 118 further includes a plurality of outlet ports 156 defined on the top member 142 and the side members 124. The plurality of outlet ports 156 communicates with the outlet chamber 152 to discharge the exhaust gas after being treated by the aftertreatment module 116 to the atmosphere from the engine 100. Further, the exhaust pipe 122 may be connected to at least one of the plurality of outlet ports 156 for discharging the exhaust gas to the atmosphere. In an embodiment, the exhaust pipe 122 may be configured to supply the exhaust gas to a noise attenuation device, for example, a muffler, for reducing noise.

The plurality of outlet ports 156 includes a first front outlet port 158 defined on the front side member 134 along a first longitudinal axis 'AA' parallel to the central axis 'CA'. In the illustrated embodiment, the first front outlet port 158 is defined, adjacent to the first side member 126, by a first outlet duct 159 extending from the front side member 134. In an embodiment, the first front outlet port 158 may be defined by an external member coupled to the front side member 134 by various fastening methods, such as welding, bolting, and the like. As shown in FIG. 1, the first outlet duct 159 may have a circular cross section. However, it may be contemplated that the first outlet duct 159 may have a cross sectional shape, such as a square, a rectangular, a polygonal, or any other shape known in the art. Further, a first lid member 159A may be releasably coupled to the first outlet duct 159 for closing the first front outlet port 158 based on various applications.

The plurality of outlet ports 156 also includes a second front outlet port 160 defined on the front side member 134 along a second longitudinal axis 'BB' parallel to the central axis 'CA'. The second longitudinal axis 'BB' is spaced apart from the first longitudinal axis 'AA' by a distance 'D1'. In the illustrated embodiment, the second front outlet port 160 is defined, adjacent to the second side member 128, by a second outlet duct 161. The second outlet duct 161 may correspond to an extension of the front side member 134 along the second longitudinal axis 'BB'. In another embodiment, the second outlet duct 161 may be an external member coupled to the front side member 134 by various fastening methods, such as welding, bolting, and the like. Referring to FIG. 1 and FIG. 3, the second front outlet port 160 may have a circular cross section. However, it may be contemplated that the second front outlet port 160 may have a cross sectional shape, such as a square, a rectangular, a polygonal, or any other shape known in the art. Further, a second lid member 161A may also be releasably coupled to the second outlet duct 161 for closing the second front outlet port 160 based on various applications.

Figure 4:
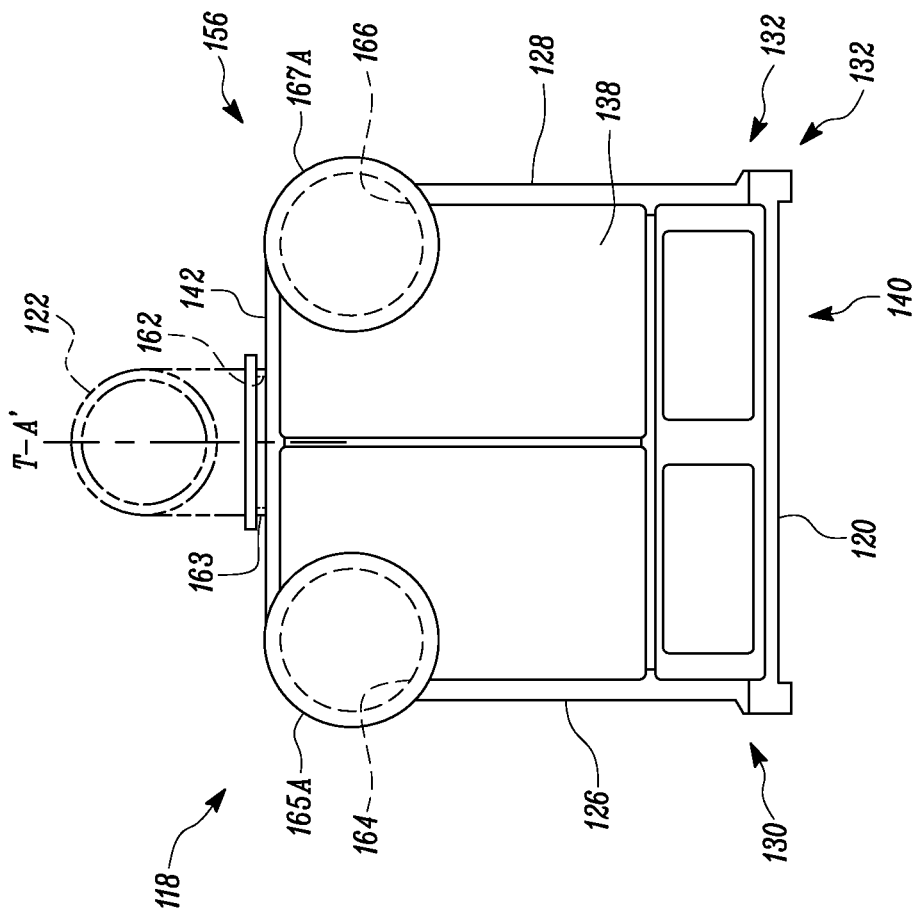
FIG. 4 is a rear side view of the housing member, according to an embodiment of the present disclosure.

FIG. 4 illustrates a rear view of the housing member 118, according to an embodiment of the present disclosure. The plurality of outlet ports 156 further includes a top outlet port 162 defined on the top member 142. The top outlet port 162 is defined along a transverse axis 'TA' perpendicular to the central axis 'CA'. In the illustrated embodiment, the top outlet port 162 is defined by a top outlet duct 163. The top outlet duct 163 may correspond to an extending portion of the top member 142 along the transverse axis 'TA'. In another embodiment, the top outlet duct 163 may be an external member coupled to the top member 142 by various fastening methods, such as welding, bolting, and the like. Further, referring to FIG. 3 and FIG. 4, the top outlet port 162 may have a circular cross section. However, it may be contemplated that the top outlet port 162 may have other cross sectional shape, such as a square, a rectangular, a polygonal or any other shape known in the art. Further, a third lid member 163A (shown in FIG. 5) may be releasably coupled to the top outlet duct 163 for closing the top outlet port 162 based on various applications.

Referring to FIG. 3 and FIG. 4, the plurality of outlet ports 156 further includes a first rear outlet port 164 defined on the rear side member 138 along a third longitudinal axis 'CC' parallel to the central axis 'CA'. In an embodiment, the third longitudinal axis 'CC' may correspond to the first longitudinal axis 'AA'. In another embodiment, an offset may also be defined between the third longitudinal axis 'CC' and the first longitudinal axis 'AA'. Further, the first rear outlet port 164 is defined, adjacent to the first side member 126, by a third outlet duct 165. The first rear outlet port 164 may be an extending portion of the rear side member 138. In another embodiment, the third outlet duct 165 may be an external member coupled to the rear side member 138 by various fastening methods such as, welding, bolting, and the like.

As shown in FIG. 4, the third outlet duct 165 may have a circular cross section. However, it may be contemplated that the third outlet duct 165 may have a cross sectional shape, such as a square, a rectangular, a polygonal, or any other shape known in the art. Further, a fourth lid member 165A may also be releasably coupled to the third outlet duct 165 for closing the first rear outlet port 164 based on various applications.

Referring to FIG. 3 and FIG. 4, the plurality of outlet ports 156 further includes a second rear outlet port 166 defined on the rear side member 138 along a fourth longitudinal axis 'DD' parallel to the central axis 'CA'. In an embodiment, the fourth longitudinal axis 'DD' may correspond to the second longitudinal axis 'BB'. In another embodiment, an offset may also be defined between the fourth longitudinal axis 'DD' and the second longitudinal axis 'BB'. The fourth longitudinal axis 'DD' is spaced apart from the third longitudinal axis 'CC' by a distance 'D2'. In an embodiment, the distance 'D2' may be equal to the distance 'D1'.

In the illustrated embodiment, the second rear outlet port 166 is defined, adjacent to the second side member 128, by a fourth outlet duct 167 extending from the rear side member 138 along the fourth longitudinal axis 'DD'. In an alternate embodiment, the second rear outlet port 166 may be defined by an external member coupled to the front side member 134 by various fastening methods such as, welding, bolting, and the like. As shown in FIG. 4, the second rear outlet port 166 may have a circular cross section. However, it may be contemplated that the second rear outlet port 166 may have a cross sectional shape, such as a square, a rectangular, a polygonal, or any other shape known in the art. Further, a fifth lid member 167A may be releasably coupled to the fourth outlet duct 167 for closing the second rear outlet port 166 based on various applications.

Figure 5:
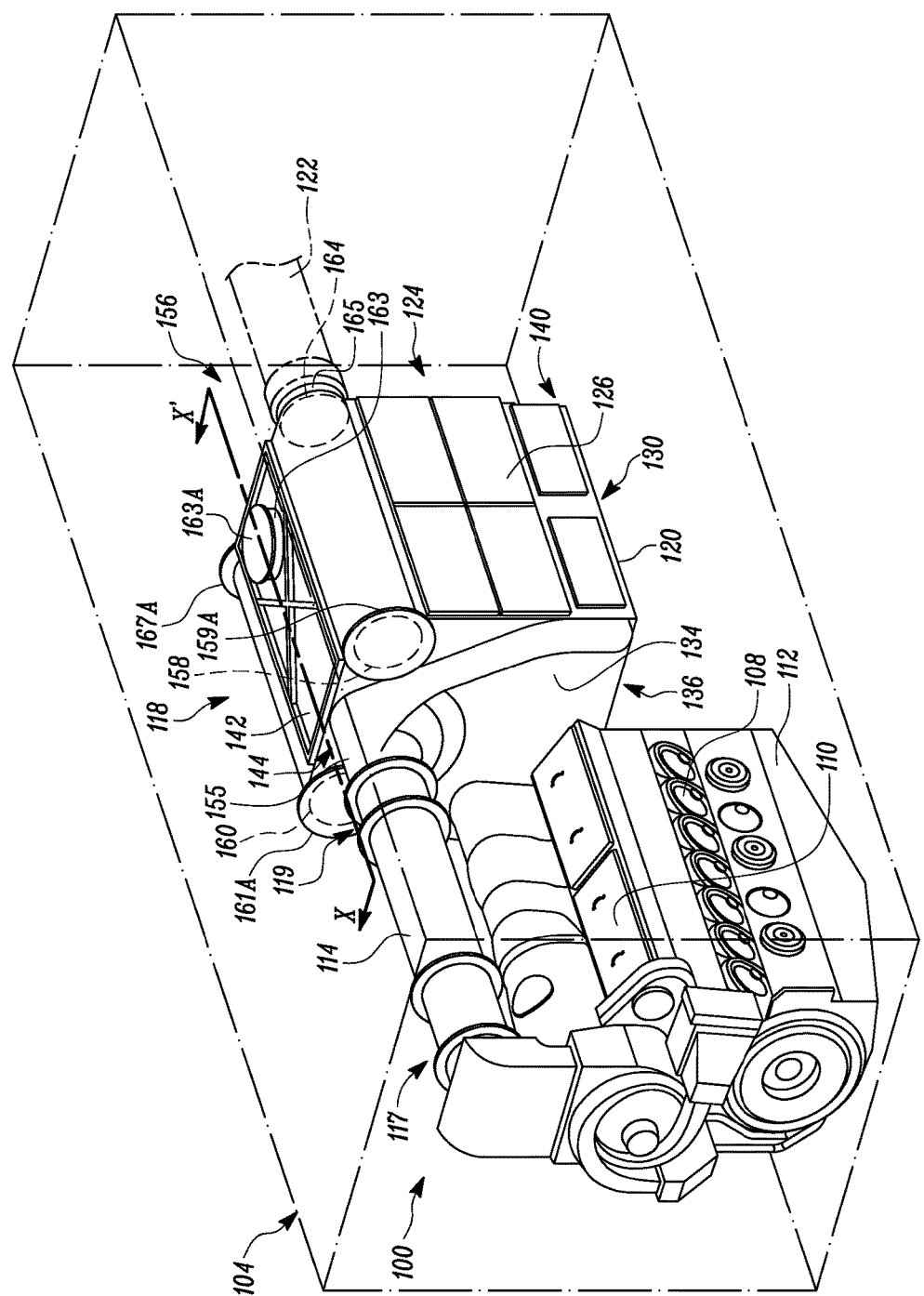
FIG. 5 is a perspective view of the engine, according to another embodiment of the present disclosure.

Specifically, the exhaust gas, after being treated by the aftertreatment module 116 may, be discharged into atmosphere from at least one of the first front outlet port 158, the second front outlet port 160, the top outlet port 162, the first rear outlet port 164, and the second rear outlet port 166. In such a case, at least one of the first outlet duct 159, the second outlet duct 161, the top outlet duct 163, the third outlet duct 165, and the fourth outlet duct 167 may be coupled to the exhaust pipe 122 by removing a corresponding lid member. FIG. 5 illustrates a perspective view of the engine 100, according to another embodiment of the present disclosure. More specifically, the exhaust gas, after being treated by the aftertreatment module 116, is discharged from the first rear outlet port 164 into atmosphere. In the illustrated embodiment, the third outlet duct 163 is coupled with the exhaust pipe 122 by removing the fourth lid member 165A. It may be contemplated that the third outlet duct 163 may be coupled to the exhaust pipe 122 via various coupling methods, such as welding, fluid couplings, fastening, and the like.

The third outlet duct 163 receives exhaust gas from the outlet chamber 152, via the first rear outlet port 164, for discharging the exhaust gas to atmosphere through the exhaust pipe 122. Further, the exhaust pipe 122 may be coupled with the top outlet duct 163 in various orientations by rotating the exhaust pipe 122. In an example, the exhaust pipe 122 may bend to move vertically to exit the engine room 104. In another example, the exhaust pipe 122 may extend parallel to the exhaust conduit 114 to exit the engine room 104.

INDUSTRIAL APPLICABILITY

The present disclosure relates to the housing member 118 for the aftertreatment module 116 associated with the engine 100. The housing member 118 may enclose various components associated with the aftertreatment module 116, and is coupled to the engine 100 via the exhaust conduit 114 to communicate with the exhaust gas produced by the engine 100. The housing member 118 includes the plurality of outlet ports 156 to discharge the exhaust gas from the aftertreatment module 116 into the atmosphere. Based on various applications, one or more of the outlet ports 156 may be used to discharge the exhaust gas into the atmosphere by removing a corresponding lid member. Therefore, the housing member 118 provides flexibility to connect the exhaust pipe 122 with the outlet chamber 152. For illustration purpose, referring to accompanying figures, the top outlet port 162 is connected to the exhaust pipe 122 for discharging the exhaust gas received from the outlet chamber 152 to the atmosphere. In an embodiment, one or more of the first front outlet port 158, the second front outlet port 160, the top outlet port 162, the first rear outlet port 164, and the second rear outlet port 166 may be selected based on the space available in the engine room 104. For example, the first front outlet port 158 and the second front outlet port 160 may be used in applications where the space between the engine 100 and the deck portion is not sufficient to accommodate the exhaust pipe 122. The first front outlet port 158 and the second rear outlet port 166 may be used in applications where the exhaust pipe 122 is disposed near the deck portion. Further, the top outlet port 162 may be used in applications in which there is sufficient space between the engine 100 and the deck portion of the marine vessel for accommodating the exhaust pipe 122.

Therefore, by integrating the aftertreatment module 116 within the housing member 118, the space available in the engine room 104 below the deck portion may be optimally utilized to connect the aftertreatment module 116 with the exhaust pipe 122 for discharging the exhaust gas into the atmosphere. Additionally, various accessory systems may also be disposed below the housing member 118 to optimally utilize the space in the engine room 104.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A housing member for enclosing an aftertreatment module of an engine, the housing member comprising:
    a base member;
    a plurality of side members extending from the base member, the plurality of side members including a front side member;
    a top member coupled to the plurality of side members, wherein the base member, the plurality of side members and the top member are together configured to define an inlet chamber and an outlet chamber;
    an inlet port disposed on the front side member and configured to communicate with the inlet chamber, wherein the inlet port is coupled to an exhaust conduit of the engine to receive exhaust gas therethrough, wherein the inlet port is defined on the front side member along a central axis of the housing member, and wherein a first longitudinal axis and a second longitudinal axis are parallel to the central axis; and
    a plurality of outlet ports, the plurality of outlet ports defined on at least one of the top member and the plurality of side members, wherein:
        a first outlet port in the plurality of outlet ports is defined along one of the first longitudinal axis for an outlet port defined on the plurality of side members and a transverse axis perpendicular to the central axis for a top outlet port defined on the top member;
        a second outlet port in the plurality of outlet ports is defined along one of the first longitudinal axis and the second longitudinal axis; and the plurality of outlet ports communicates with the outlet chamber to discharge the exhaust gas from the aftertreatment module.

2. The housing member of claim 1, wherein the plurality of side members comprises:
a first side member;
a second side member spaced apart from the first side member;
the front side member extending between the first side member and the second side member at a front end of the base member; and
a rear side member extending between the first side member and the second side member at a rear end of the base member.

3. The housing member of claim 2, wherein the plurality of outlet ports comprises:
the first outlet port being a first front outlet port defined on the front side member along the first longitudinal axis; and
the second outlet port being a second front outlet port defined on the front side member along the second longitudinal axis,
wherein the first longitudinal axis and the second longitudinal axis are spaced apart from each other.

4. The housing member of claim 2, wherein the plurality of outlet ports comprises:
the first outlet port being a first rear outlet port defined on the rear side member along the first longitudinal axis; and
the second outlet port being a second rear outlet port defined on the rear side member along the second longitudinal axis,
wherein the first longitudinal axis and the second longitudinal axis are spaced apart from each other.

5. The housing member of claim 2, wherein the plurality of outlet ports comprises:
the first outlet port being a first front outlet port and a third outlet port in the plurality of outlet ports being a first rear outlet port defined on the front side member and the rear side member, respectively, along the first longitudinal axis; and
the second outlet port being a second front outlet port and a fourth outlet port in the plurality of outlet ports being a second rear outlet port defined on the front side member and the rear side member, respectively, along the second longitudinal axis, wherein the first longitudinal axis and the second longitudinal axis are spaced apart from each other.

6. The housing member of claim 2, wherein the plurality of outlet ports comprises:
the first outlet port being the top outlet port defined on the top member along the transverse axis; and
the second outlet port being one of a first front outlet port defined on the front side member along the first longitudinal axis, a second front outlet port defined on the front side member along the second longitudinal axis, a first rear outlet port defined on the rear side member along the first longitudinal axis, and a second rear outlet port defined on the rear side member along the second longitudinal axis;
wherein the first longitudinal axis and the second longitudinal axis are spaced apart from each other.

7. The housing member of claim 5, wherein one or more of the first front outlet port, the first rear outlet port, the second front outlet port, the second rear outlet port and the top outlet port are coupled to an exhaust pipe to discharge the exhaust gas from the aftertreatment module.

8. The housing member of claim 7, wherein the one or more of the first front outlet port, the first rear outlet port, the second front outlet port, the second rear outlet port and the top outlet port are selected based on a space available in an engine room to accommodate the exhaust pipe therein.

9. The housing member of claim 7, further comprising at least one lid member, a lid member in the at least one lid members coupled to one or more of the first front outlet port, the first rear outlet port, the second front outlet port, the second rear outlet port, and the top outlet port that is not coupled to the exhaust pipe.

10. An engine for a marine vessel comprising:
an exhaust conduit; and
a housing member coupled to the exhaust conduit and enclosing an aftertreatment module of the engine, the housing member comprising:
a base member;
a plurality of side members extending from the base member, the plurality of side members including a front side member;
a top member coupled to the plurality of side members, wherein the base member, the plurality of side members and the top member are together configured to define an inlet chamber and an outlet chamber;
an inlet port disposed on the front side member and configured to communicate with the inlet chamber, wherein the inlet port is coupled to the exhaust conduit, wherein the inlet port is defined on the front side member along a central axis of the housing member, and wherein a first longitudinal axis and a second longitudinal axis are parallel to the central axis; and
a plurality of outlet ports, the plurality of outlet ports defined on at least one of the top member and the plurality of side members, wherein:
a first outlet port in the plurality of outlet ports is defined along one of the first longitudinal axis for an outlet port defined on the plurality of side members and a transverse axis, perpendicular to the central axis for an outlet pot defined on the top member;
a second outlet port in the plurality of outlet ports is defined along one of the first longitudinal axis and the second longitudinal axis; and
the plurality of outlet ports communicates with the outlet chamber to discharge exhaust gas from the aftertreatment module.

11. The engine of claim 10, wherein the plurality of side members comprises:
a first side member;
a second side member spaced apart from the first side member;
the front side member extending between the first side member and the second side member at a front end of the base member; and
a rear side member extending between the first side member and the second side member at a rear end of the base member.

12. The engine of claim 11, wherein the plurality of outlet ports comprises:
first outlet port being a first front outlet port defined on the front side member along the first longitudinal axis; and
the second outlet port being a second front outlet port defined on the front side member along the second longitudinal axis,
wherein the first longitudinal axis and the second longitudinal axis are spaced apart from each other.

13. The engine of claim 11, wherein the plurality of outlet ports comprises:
the first outlet port being a first rear outlet port defined on the rear side member along the first longitudinal axis; and
the second outlet port being a second rear outlet port defined on the rear side member along the second longitudinal axis,
wherein the first longitudinal axis and the second longitudinal axis are spaced apart from each other.

14. The housing member of claim 11, wherein the plurality of outlet ports comprises:
the first outlet port being a first front outlet port and a first rear outlet port defined on the front side member and the rear side member, respectively, along the first longitudinal axis; and
the second outlet port being a second front outlet port and a second rear outlet port defined on the front side member and the rear side member, respectively, along the second longitudinal axis, wherein the first longitudinal axis and the second longitudinal axis are spaced apart from each other.

15. A housing member for enclosing an aftertreatment module of an engine, the housing member comprising:
a base member;
a plurality of side members extending from the base member, the plurality of side members comprising:
a first side member;
a second side member spaced apart from the first side member;
a front side member extending between the first side member and the second side member at a front end of the base member; and
a rear side member extending between the first side member and the second side member at a rear end of the base member;
a top member coupled to the plurality of side members, wherein the base member, the plurality of side members and the top member are together configured to define an inlet chamber and an outlet chamber;
an inlet port disposed on the front side member and configured to communicate with the inlet chamber, wherein the inlet port is coupled to an exhaust conduit of the engine to receive exhaust gas therethrough, wherein the inlet port is defined on the front side member along a central axis of the housing member, and wherein a first longitudinal axis and a second longitudinal axis are parallel to the central axis; and
a plurality of outlet ports, the plurality of outlet ports defined on at least one of the top member and the plurality of side members, wherein the plurality of outlet ports communicates with the outlet chamber to discharge the exhaust gas from the aftertreatment module, and wherein the plurality of outlet ports comprises:
a first front outlet port and a first rear outlet port defined on the front side member and the rear side member, respectively, along the first longitudinal axis;
a second front outlet port and a second rear outlet port defined on the front side member and the rear side member, respectively, along the second longitudinal axis, wherein the first longitudinal axis and the second longitudinal axis are spaced apart from each other; and
a top outlet port defined on the top member.

16. The housing member of claim 15, wherein one or more of the first front outlet port, the first rear outlet port, the second front outlet port, the second rear outlet port and the top outlet port are coupled to an exhaust pipe to discharge the exhaust gas from the aftertreatment module.

17. The housing member of claim 16, wherein the one or more of the first front outlet port, the first rear outlet port, the second front outlet port, the second rear outlet port and the top outlet port are selected based on a space available in an engine room to accommodate the exhaust pipe therein.

* * * * *